(12) United States Patent
Jones et al.

(10) Patent No.: US 8,526,313 B1
(45) Date of Patent: Sep. 3, 2013

(54) SYSTEM AND METHOD FOR EXTENDING CONNECTIVITY TESTS THROUGH A PACKET NETWORK

(75) Inventors: David Eric Jones, Huntsville, AL (US); Marc Kimpe, Huntsville, AL (US); Harold Lloyd Boling, Madison, AL (US)

(73) Assignee: ADTRAN, Inc., Huntsville, AL (US)

(*) Notice: Subject to any disclaimer, the term of this patent is extended or adjusted under 35 U.S.C. 154(b) by 371 days.

(21) Appl. No.: 12/763,609

(22) Filed: Apr. 20, 2010

(51) Int. Cl.
*H04L 12/26* (2006.01)

(52) U.S. Cl.
USPC .......................................................... 370/249

(58) Field of Classification Search
None
See application file for complete search history.

(56) References Cited

U.S. PATENT DOCUMENTS

| | | | |
|---|---|---|---|
| 6,209,039 B1* | 3/2001 | Albright et al. ............... | 709/249 |
| 6,266,342 B1* | 7/2001 | Stacey et al. .................. | 370/465 |
| 8,179,785 B1* | 5/2012 | Newman ........................ | 370/217 |
| 8,331,244 B1 | 12/2012 | Jones et al. | |
| 2004/0078483 A1 | 4/2004 | Simila et al. | |
| 2004/0136713 A1 | 7/2004 | Lim et al. | |
| 2005/0249119 A1 | 11/2005 | Elie-Dit-Cosaque et al. | |
| 2005/0249124 A1 | 11/2005 | Elie-Dit-Cosaque et al. | |
| 2008/0259959 A1 | 10/2008 | Zhai | |
| 2009/0113070 A1 | 4/2009 | Mehta et al. | |
| 2009/0168783 A1 | 7/2009 | Mohan et al. | |
| 2010/0098433 A1* | 4/2010 | Boyd et al. .................... | 398/155 |
| 2010/0278048 A1* | 11/2010 | Sawaguchi ................ | 370/241.1 |
| 2011/0116363 A1 | 5/2011 | Elie-Dit-Cosaque et al. | |

OTHER PUBLICATIONS http://eetimes.eu/10806521, "Startup sets up virtual TDM circuits over Ethernet," EE Times Europe, Sep. 8, 2009.
Boling, et al., U.S. Appl. No. 12/641,492, entitled, "Systems and Methods for Propagating Frame Relay Congestion Notifications Through a Packet Network, "filed Dec. 18, 2009.

* cited by examiner

*Primary Examiner* — Yong Zhou
(74) *Attorney, Agent, or Firm* — Maynard Cooper & Gale, P.C.; Jon E. Holland

(57) ABSTRACT

A communication system extending Ethernet Operation and Management (OAM) Loopback Message (LBM) and Loopback Replay (LBR) functionality into a time division multiplexing (TDM) domain has a first interworking function (IWF) of an Ethernet network that transmits an Ethernet Operation and Management (OAM) Loopback Message (LBM) having a first type length value (TLV) field. The first IWF controls the first TLV field to indicate that a connectivity test is to extend beyond the Ethernet network. The communication system further has a second IWF of the Ethernet network that receives the Ethernet OAM LBM and interprets the first TLV field. In addition, the second IWF performs a TDM connectivity test across a TDM connection in response to the Ethernet OAM LBM and based on the first TLV field and transmits a reply for the Ethernet OAM LBM to the first IWF, the reply prompted by the LBM and comprising data based on the TDM connectivity test.

25 Claims, 7 Drawing Sheets

SYSTEM AND METHOD FOR EXTENDING CONNECTIVITY TESTS THROUGH A PACKET NETWORK

BACKGROUND

Telecommunication service providers are rapidly turning toward Ethernet for a cheaper and more suitable means to backhaul packetized data. When granting end customers' access to their network, these service providers can find it cost effective to utilize the embedded transport infrastructure with its traditional layer 2 protocols. Time division multiplexing (TDM), such as T1 and T3, has this infrastructure, while traditional layer 2 protocols like point-to-point protocol (PPP), multi-layer point-to-point protocol (MLPPP), and Frame Relay are used to encapsulate customers' data.

The customers' data is interworked between the embedded TDM transport with its traditional layer 2 protocols and the Ethernet backhaul. Ethernet is inclusive of both its physical layer 1 transport and its logical layer 2. The layer 2 encapsulates and guides customer data within the Ethernet backhaul.

There are considerations for the interworking function other than translating customer data between Ethernet and TDM networks. In this regard, it may be desirable for the interworking function to extend Ethernet connectivity tests to the TDM network's end user. However, Ethernet standards do not address such concerns.

Accordingly, a heretofore unaddressed need exists in the industry for systems and methods capable of efficiently extending Ethernet connectivity tests beyond the packet network without violating applicable standards, such as Ethernet protocols.

SUMMARY

A communication system for propagating Ethernet connectivity tests through an Ethernet network in accordance with an embodiment of the present disclosure comprises a first interworking function (IWF) of an Ethernet network configured to transmit an Ethernet Operation and Management (OAM) Loopback Message (LBM) having a first organizational specific type length value (TLV) field, the first IWF configured to control the first TLV field to indicate that a connectivity test is to extend beyond the Ethernet network. The system further comprises a second IWF of the Ethernet network configured to receive the Ethernet OAM LBM and to interpret the first TLV field, the second IWF configured to perform a layer 2 connectivity test across a TDM connection in response to the Ethernet OAM LBM and based on the first TLV field, the second IWF further configured to transmit a Loopback Reply (LBR) for the Ethernet OAM LBM to the first IWF, the reply containing results of the layer 2 connectivity test across the TDM connection.

A communication method for propagating Ethernet connectivity tests through an Ethernet network in accordance with an embodiment of the present disclosure comprises generating, by a first interworking function (IWF) on an edge of the Ethernet network, an Ethernet Operation and Management (OAM) Loopback Message (LBM) having a first organizational specific type length value (TLV) field indicating that a connectivity test is to extend beyond the Ethernet network. In addition, the method comprises receiving, by a second IWF on an edge of the Ethernet network, the Ethernet OAM LBM, interpreting the first TLV field, and performing a layer 2 connectivity test across a TDM connection in response to the Ethernet OAM LBM and based on the first TLV field. The method further comprises transmitting a Loopback Reply for the Ethernet OAM LBM to the first IWF, the reply containing results of the layer 2 connectivity test.

DESCRIPTION

A system in accordance with an embodiment of the present disclosure comprises a time division multiplexing (TDM) node that transmits customer data (e.g. IP packets) encapsulated within a layer 2 protocol (e.g. PPP, MLPPP, Frame Relay) inside the TDM frames to a remote TDM node. The customer data propagates through a packet network segment, e.g., an Ethernet segment, that provides connectivity between the two TDM nodes.

The packet network comprises an internetwork function (IWF) node at an edge of the network. The IWF node de-encapsulates the customer data from the layer 2 protocol carried by the TDM frames and re-encapsulates the customer data into Ethernet packets for communication through the packet network. In addition, another IWF node de-encapsulates the customer data from the Ethernet packets and re-encapsulates the customer data into the layer 2 protocol carried by TDM frames to another TDM node.

During operation, it may be desirable to determine the connectivity status between an IWF node and an associated far end TDM node. In one embodiment of the present disclosure, one of the IWF nodes originates and transmits an Ethernet Operation and Management (OAM) loopback message (LBM) to another IWF node. The LBM contains information indicating that a connectivity test is to be performed on one of the TDM nodes. The receiving IWF transmits a connectivity test request to the TDM node, and the TDM node transmits a connectivity test reply to this IWF. The IWF then transmits a loopback reply (LBR) to the originating IWF. The LBR contains information indicating the connectivity status of the TDM node.

Figure 1:
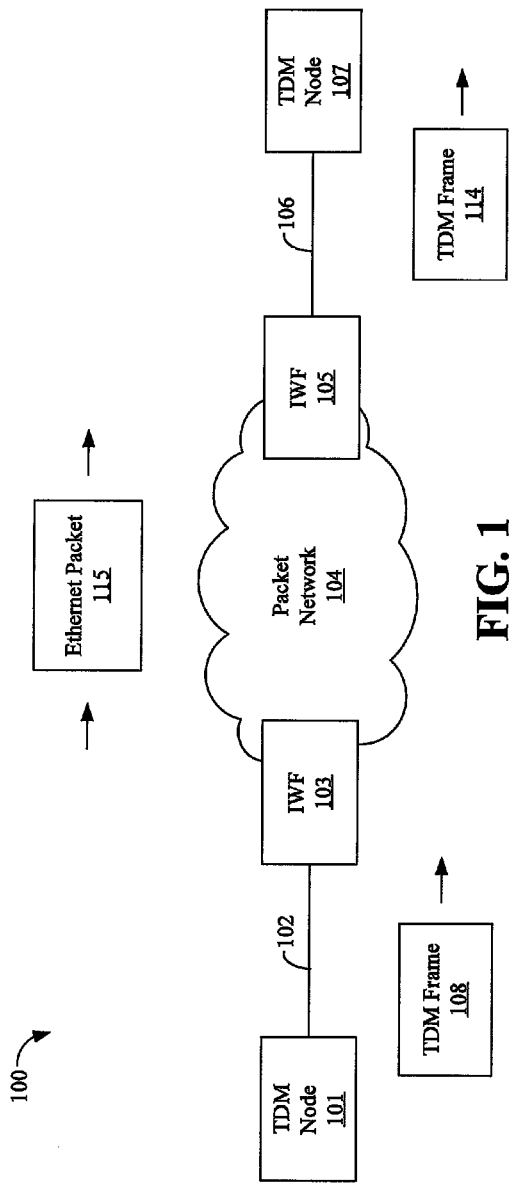
FIG. 1 is a block diagram depicting an exemplary embodiment of a packet network system connecting multiple time division multiplexing (TDM) nodes.

FIG. 1 depicts an exemplary embodiment of a packet network system 100 comprising a packet network 104 connected to multiple time division multiplexing (TDM) nodes, including TDM node 101 and TDM node 107. The TDM nodes 101, 107 communicate with one another through the packet network 104, such as the Ethernet. In this regard, the TDM node 101 is coupled to an interworking function (IWF) 103 of the network 104 via a communication connection 102, such as one or more twisted pairs, and the TDM node 107 is coupled to an IWF 105 via a communication connection 106, such as one or more twisted pairs. Data packets may be communicated by the IWFs 103, 105 through the network 104. The IWFs 103, 105 provide an interface between TDM networks comprising at least the nodes 101, 107 and the packet network 104, which is embedded between the TDM networks. For illustrative purposes, it will be assumed hereafter that the network 104 is an Ethernet network and that the packets communicated by the IWFs 103, 105 are in accordance with applicable Ethernet protocols, such as I.E.E.E. 802.1ag-2007, although other types of packet networks and other types of protocols are possible in other embodiments.

The IWFs 103, 105 are configured to receive TDM frames and to translate the customer data of the layer 2 protocols (e.g., PPP, MLPPP) transported by the TDM frames into Ethernet packets for communication through the network 104. For example, assume that the TDM node 101 transmits a TDM frame 108 with a layer 2 protocol carrying customer data to be received by the TDM node 107. The TDM frame 108 is received by the IWF 103, which de-encapsulates the customer data of the layer 2 protocol transmitted by the TDM node 101 and re-encapsulates the customer data of the layer 2 protocol transported by the TDM frame 108 into one or more Ethernet packets 115 destined for the IWF 105. The IWF 103 transmits such packets through the packet network 104 to the IWF 105, which de-encapsulates the customer data of the Ethernet packet 115 and re-encapsulates such customer data into a layer 2 protocol to be placed in at least one TDM frame 114 for transmission to the TDM node 107.

Various types of protocols may be used to communicate the data that is to be received by the TDM node 107. Exemplary protocols will be described in more detail below, but it should be emphasized that other protocols may be used in other embodiments. In one exemplary embodiment, the TDM frame 108 transmitted by the TDM node 101 is carried by a T1 signal, but other types of signals, such as T3 signals, may be used. In addition, the TDM frame 108 comprises Internet Protocol (IP) packets, which are the payload of the layer 2 protocol of the TDM frame 108 and are transmitted to the IWF 105. In other embodiments, the layer 2 protocol's customer data of the TDM frame 108 may be in a format other than IP, if desired. In one exemplary embodiment, the layer 2 protocol is Point-to-Point Protocol (PPP), but other types of layer 2 protocols, such as MLPPP or frame relay, may be used to encapsulate the payload of the layer 2 protocol in other embodiments. Thus, the TDM frame 108 comprises, in addition to the IP packet, header and framing information in accordance with IP over PPP over T1.

The IWF 103 is configured to recover the IP packet encapsulated within the layer 2 protocol of the TDM frame 108 and to interwork the IP packet into at least one Ethernet packet 115 for communication through the network 104. In this regard, the IWF 103 strips away the PPP and T1 layers to recover the IP packet and then encapsulates the IP packet into an Ethernet packet 115, which is transmitted through the network 104 to the IWF 105. The IWF 105 strips away the Ethernet layers to recover the IP packet and then encapsulates the IP packet according to a layer 2 protocol to form a TDM frame 114 that is transmitted to the TDM node 107.

If desired, the IWF 105 may layer the IP packet via the same protocols used by the TDM node 101. For example, if the TDM frame 108 transmitted by the TDM node 101 is IP over PPP over T1, as described above, then the IWF 105 may layer the IP packet to be received by the TDM node 107 via PPP and T1, as well. Thus, the TDM node 107 receives data in the same format as if the packet network 104 was absent from the system 100. That is, the presence of the network 104 is transparent to the operation of TDM nodes 101, 107.

I.E.E.E. 802.1ag-2007 defines Ethernet Operations and Maintenance (OAM) standards that are used to convey operation and maintenance information about the network 104. Using Ethernet OAM, the IWFs 103, 105 can detect network events and issues that affect the flow of data through the packet network 104.

In this regard, Ethernet OAM defines two message types that are used to verify connectivity between points within the Ethernet network 104. In particular, the Ethernet OAM defines a loopback message (LBM) that can be transmitted from a first IWF 103, 105, referred to hereafter as a "source node," to a second IWF 105, 103, referred to hereafter as the "test node." In general, an LBM is a control message that, instead of carrying customer data, carries control information for causing a test node to reply so that connectivity with the receiving node can be confirmed and/or evaluated. Notably, the LBM comprises an address that identifies the particular IWF 103, 105 to which the LBM is to be transmitted. Ethernet OAM also defines a loopback reply (LBR) that is to be transmitted by the test node, in response to an LBM, to the source node. In general, an LBR is a control message that, instead of carrying customer data, carries control information responsive to an LBM and so that connectivity between the test node and the source node can be confirmed and/or evaluated by the source node of the LBM. Notably, the LBR comprises an address that identifies the particular IWF 103, 105 to which the LBR is to be transmitted. Thus, the source node confirms connectivity with the test node by transmitting an Ethernet OAM LBM and receiving an Ethernet OAM LBR from the test node. If the source node does not receive the LBR from the test node within a specified time period of transmitting the LBM to the test node, then the source node detects a communication error or problem.

Thus, as an example, the IWF 103 may test connectivity to the IWF 105 by transmitting, to the IWF 105, an Ethernet OAM LBM to which the IWF 105 responds with an Ethernet OAM LBR. In addition, in accordance with an embodiment of the present disclosure, the IWF 103 may also perform a connectivity test that extends beyond the IWF 105, such as to the TDM node 107, which is described further with reference to FIG. 2.

Note that, according to Ethernet standards, the OAM LBM comprises a defined organizational specific type length value (TLV) field. The TLV field does not have a defined use within the standard, other than it is used per a vendor's discretion. The field is only interpreted by the receiving node, and use of the TLV field will not cause problems or errors with intermediate Ethernet nodes.

Further note that the OAM LBR, like the LBM, comprises a defined organizational specific TLV field. This TLV field also does not have a defined use within the standard, other than it is used per a vendor's discretion. The field is only interpreted by the receiving node, and use of the TLV field will not cause problems or errors with intermediate Ethernet nodes.

Figure 2:
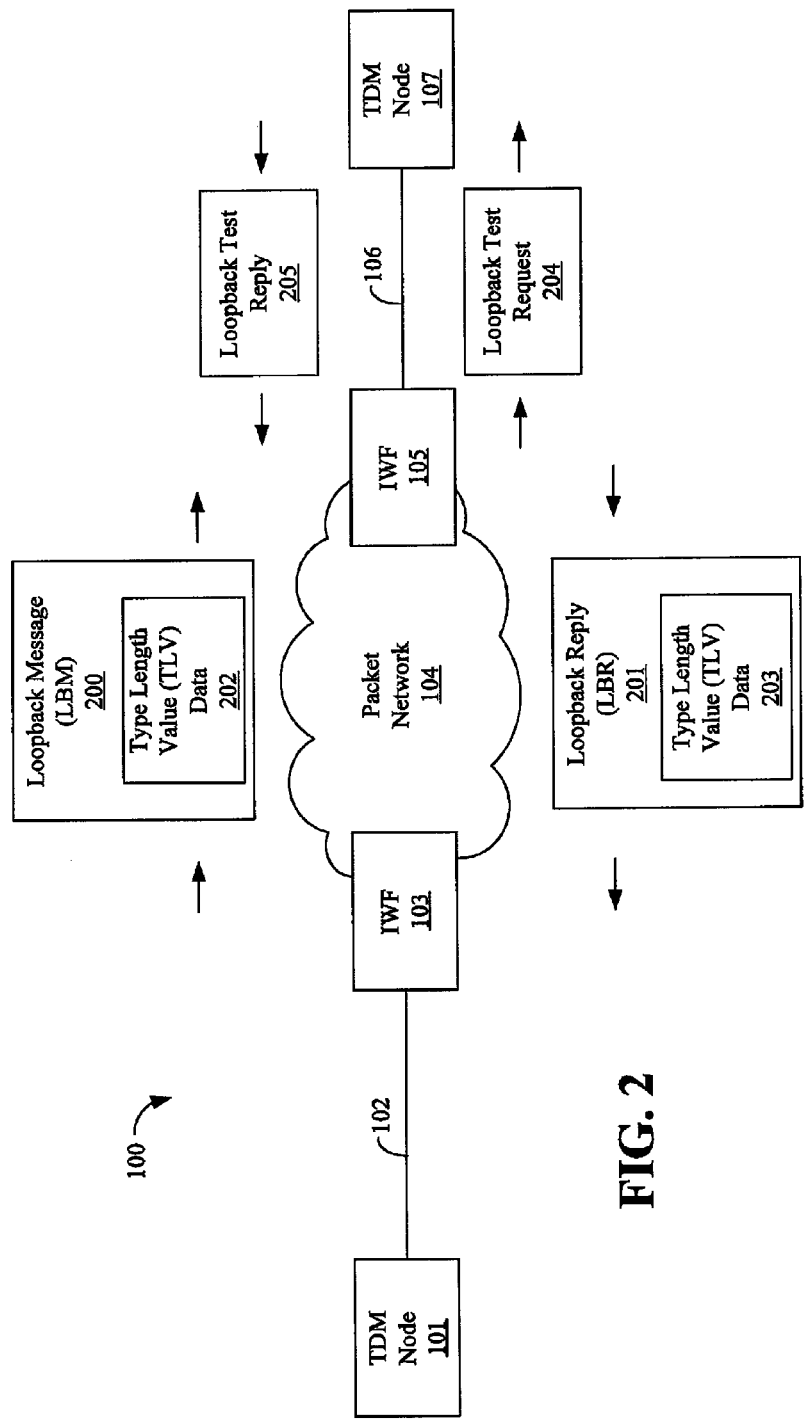
FIG. 2 depicts an exemplary system, such as is depicted in FIG. 1, having extended test capabilities in accordance with an embodiment of the present disclosure.

The system 100 is now described with reference to FIG. 2 further illustrating the use of the LBR and LBM to perform connectivity tests on the TDM nodes 101, 107. For illustrative purposes, FIG. 2 depicts a connectivity test that originates with IWF 103 and tests IWF 105 and TDM node 107. Notably, a connectivity test could also originate at IWF 105 and test IWF 103 and TDM node 101.

In the embodiment shown, the IWF 103 generates a LBM 200 having type length value (TLV) data 202. The TLV data 202 comprises a bit or set of bits that can be manipulated to indicate certain information. In the present disclosure, the IWF 103 asserts one or more of the bits in the TLV data 202 to indicate that a connectivity test is to be performed on the TDM node 107.

The IWF 105 receives the LBM 200 from the IWF 103. The IWF 105 interprets the TLV data 202 to determine if the IWF 105 is to perform a connectivity test on the TDM node 107 via the connection 106. If the IWF 105 does not interpret the TLV data 202 as indicating that a connectivity test is to be performed on the TDM node 107, the IWF 105 responds to the LBM with an LBR in accordance with the OAM standard, i.e., indicating connectivity of the IWF 105.

However, if the IWF 105 interprets the TLV data 202 as indicating that a connectivity test is to be performed on the TDM node 107, the IWF 105 transmits a loopback test request 204 to the TDM node 107. If the connection 106 and the TDM node 107 are operational, the TDM node 107 transmits a loopback test reply 205 back to the IWF 105. The IWF 105 determines, based upon the loopback test reply 204, whether there is undisturbed connectivity with the TDM node 107. Note that it is possible for the TDM node 107 to not reply at all to the loopback test request 204, which would indicate to the IWF 105 that there is a problem with the connection 106 and/or the TDM node 107.

When the IWF 105 determines that there is no connectivity, there is disturbed connectivity, or there is undisturbed connectivity with the TDM node 107, based on the loopback test reply 205, the IWF 105 then generates an LBR 201 and asserts one or more bits of the TLV data 203 to indicate that there is no connectivity, there is disturbed connectivity, or there is undisturbed connectivity with the TDM node 107. The IWF 105 transmits such LBR 201 to the IWF 103. Based on the LBR 201, the IWF 103 confirms connectivity with the IWF 105 but also determines if there is a problem with connectivity between the IWF 105 and the TDM node 107.

There are various techniques that can be used to perform a TDM loopback test reply and TDM loopback test request along the TDM segment that includes the connection 106 and the TDM node 107 depending on the protocols being employed. As an example, for PPP or MLPPP, Link Control Protocol (LCP) defines an Echo Request message that includes a data string to be returned by the TDM node 107. That is, in response to an Echo Request from the IWF 105, the TDM node 107 replies and includes a data string from the Echo Request in the reply.

Upon receiving the reply, the IWF 105 analyzes the data string to determine whether it matches the data string transmitted in the Echo Request. In addition, in response to the reply, the IWF 105 also transmits an Ethernet OAM LBR to the IWF 105 that indicates whether there is connectivity or a fault in the connection by asserting one or more bits in the TLV data 203 of the LBR 201. As an example, one bit of the TLV data 203 may indicate whether a reply from 107 is received. Another bit of the TLV data 203 may indicate whether the received data string was erroneous. Based on the LBR 201, the IWF 103 confirms connectivity from the IWF 105 to the TDM node 107.

As another example, the TDM segment comprising the connection 106 and the TDM node 107 may be Frame Relay. In such an example, a Link Management Interface (LMI) link integrity verification enquiry may be used to test the TDM connection 106 and TDM node 107 via techniques similar to those described above for PPP or MLPPP. LMI is used to communicate link information and permanent virtual connection (PVC) status between frame relay end points. Sequence numbers in the link integrity verification response can verify the health of the connection between the frame relay end points, and this health can be communicated in the TLV field of the LBR 201 transmitted from the IWF 105 to the IWF 103. Thus, connectivity to both the IWF 105 and the TDM node 107 can be verified on demand.

Note that in one embodiment, the connectivity test can be initiated by the TDM node 101 and extend beyond the Ethernet network 104. If the loopback test request includes a data string, such as a test packet, that creates a loopback test reply to be returned to the TDM node 101 for the test, the request and reply data string can be carried in the bits of the TLV data 202, 203 of the LBM 200 and LBR 201, respectively, so that the Ethernet network 104 appears transparent to the TDM Node's generation and detection of its own connectivity test.

Figure 3:
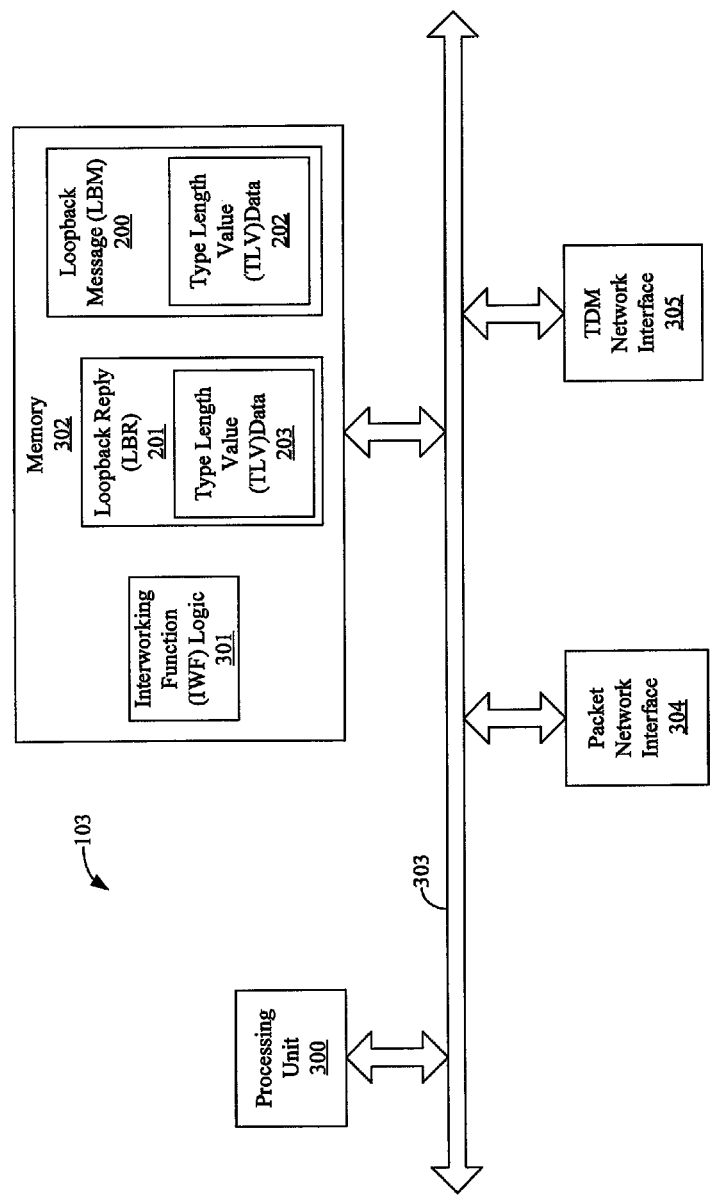
FIG. 3 is a block diagram of a first interworking function (IWF) of the system depicted in FIG. 2.

FIG. 3 is a block diagram depicting an exemplary IWF 103 in accordance with an embodiment of the present disclosure. The IWF 103 comprises a processing unit 300, a packet network interface 304, a TDM network interface 305, and memory 302. Each of these components communicates over a local interface 303, which can include one or more buses.

In addition, the IWF 103 comprises IWF logic 301. The IWF logic 301 can be implemented in software, hardware, firmware or any combination thereof. In the exemplary IWF 103 shown in FIG. 3, IWF logic 301 is implemented in software and stored in memory 302. Memory 302 may be of any type of memory known in the art, including, but not limited to random access memory (RAM), read-only memory (ROM), flash memory, and the like.

Processing unit 300 may be a digital processor or other type of circuitry configured to run the IWF logic 301 by processing and executing the instructions of the IWF logic 301. The processing unit 300 communicates to and drives the other elements within the IWF 103 via the local interface 303, which can include one or more buses.

In addition, the packet network interface 304 may be any type of communication device (e.g., a modem) that communicatively couples the IWF 103 with the packet network 104 (FIG. 1) and the TDM network interface 305 may be any type of communication device that communicatively couples the IWF 103 with the TDM node 101 (FIG. 1).

During operation, the IWF logic 301 generates the LBM 200 in order to initiate a connectivity test of the TDM node 107 (FIG. 2) and a connectivity test of the IWF 105. When the loopback test is to be performed on the TDM node 107, the LBM 200 comprises the TLV data 202, and the IWF logic 301 manipulates the TLV data, e.g., asserts one or more bits of the data, to indicate that a connectivity test is to be performed on the TDM node 107.

The IWF logic 301 then transmits the LBM 200, via the network interface 304, to the IWF 105 (FIG. 2). The IWF 105 interprets the TLV data 202 to determine whether a connectivity test is to be performed on the TDM node 107. The IWF 105 responds with an LBR 201 (FIG. 2) in accordance with standard OAM procedures for the packet network 104.

If the TLV data 202 indicates a connectivity test on the TDM node 107, the IWF 105 performs the connectivity test on the TDM node 107 and generates an LBR 201 comprising TLV data 203 that indicates whether the connectivity test was successful. The IWF logic 301 receives the LBR 201 and stores the LBR 201 in memory 302. The IWF logic 301 then interprets the TLV data 203 of the LBR 201 to determine whether the connectivity test performed on the TDM node 107 was successful.

Figure 4:
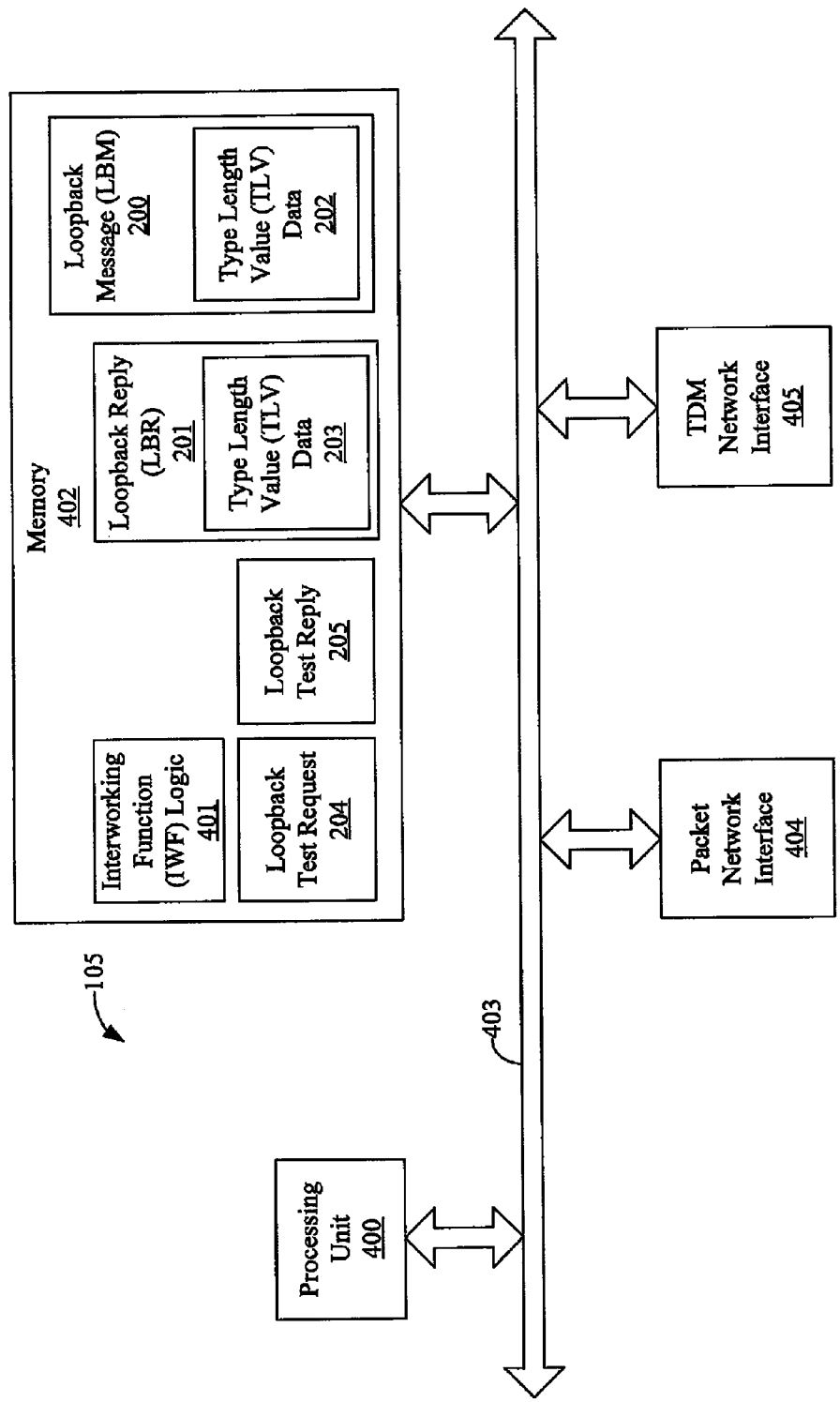
FIG. 4 is a block diagram of a second interworking function (IWF) of the system depicted in FIG. 2.

FIG. 4 is a block diagram depicting an exemplary IWF 105 in accordance with an embodiment of the present disclosure. The IWF 105 comprises a processing unit 400, a packet network interface 404, a TDM network interface 405, and memory 402. Each of these components communicates over a local interface 403, which can include one or more buses.

In addition, the IWF 105 comprises IWF logic 401. The IWF logic 401 can be implemented in software, hardware, firmware or any combination thereof. In the exemplary IWF 105 shown in FIG. 4, IWF logic 401 is implemented in software and stored in memory 402. Memory 402 may be of any type of memory known in the art, including, but not limited to random access memory (RAM), read-only memory (ROM), flash memory, and the like.

Processing unit 400 may be a digital processor or other type of circuitry configured to run the IWF logic 401 by processing and executing the instructions of the IWF logic 401. The processing unit 400 communicates to and drives the other elements within the IWF 105 via the local interface 403, which can include one or more buses.

In addition, the packet network interface 404 may be any type of communication device (e.g., a modem) that communicatively couples the IWF 105 with the packet network 104 (FIG. 1) and the TDM network interface 405 may be any type of communication device that communicatively couples the IWF 105 with the TDM node 107 (FIG. 1).

During operation, the IWF logic 401 receives, via the packet network interface 404, the LBM 200 comprising the TLV data 202. As described hereinabove, the IWF logic 301 (FIG. 3) asserts one or more bits in the TLV data 202, if a connectivity test is to be performed by the IWF 105. Thus, the IWF logic 401 interprets the TLV data 202 of the LBM 200 to determine whether a connectivity test is to be performed on the TDM node 107. If the TLV data 202 does not indicate that a connectivity test is to be performed on the TDM node 107, the IWF logic 401 responds with an LBR 201 in accordance with standard OAM procedure.

If the TLV data 202 indicates that a connectivity test is to be performed on the TDM node 107, the IWF logic 401 generates a loopback test request 204. As indicated hereinabove, there are various techniques that can be used to perform a TDM connectivity test along the TDM segment comprised of the connection 106 (FIG. 1) and the TDM node 107 depending on the protocols being employed. The IWF logic 401 transmits the loopback test request 204 to the TDM node 107 in accordance with the protocols being employed.

In response to the loopback test request 204, the TDM node 107 may transmit to the IWF 105 a loopback test reply 205. Alternatively, if the TDM node 107 is currently not operational or if there is a problem with the connection 106, the TDM node 107 may not reply to the IWF 105.

If a loopback test reply 205 is received from the TDM node 107, the IWF logic 401 interprets the loopback test reply 205 to determine if the TDM node 107 is operational. If the loopback test reply 205 indicates that the TDM node 107 is operational, the IWF logic 401 generates an LBR 201 and manipulates the TLV data 203 of the LBR 201 to indicate that the TDM node 107 is operational. The IWF logic 401 then transmits the LBR 201 to the IWF 103.

If the loopback test reply 205 is not received after a specified time period or the loopback test reply 205 indicates that the TDM node 107 is not operational, the IWF logic 401 generates the LBR 201 and manipulates the TLV data 203 of the LBR 201 to indicate that the TDM node 107 is not operational. The IWF logic 401 then transmits the LBR 201 to the IWF 103.

Figure 5:
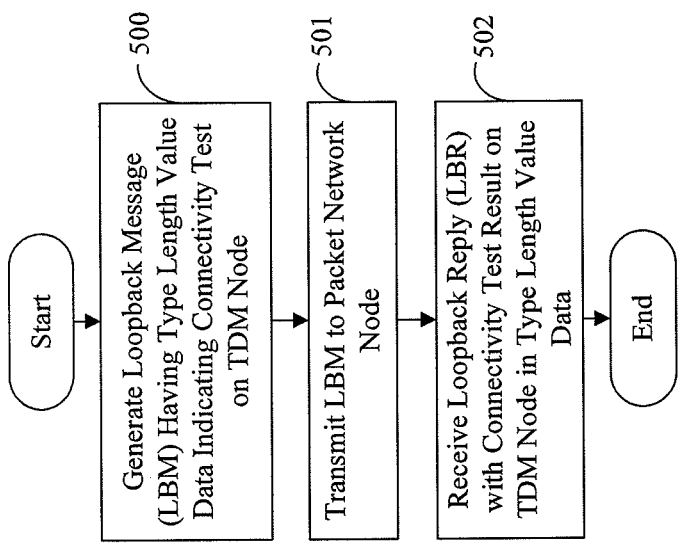
FIG. 5 is a flowchart depicting exemplary architecture and functionality of IWF logic depicted in FIG. 3.

FIG. 5 is a flowchart depicting exemplary architecture and functionality of the IWF logic 301 (FIG. 3). In step 500, the IWF logic 301 generates an LBM 200 (FIG. 2) having TLV data 203 (FIG. 2) indicating that a connectivity test be performed on the TDM node 107 (FIG. 2).

In step 501, the IWF logic 301 transmits the generated LBM 200 to a packet network node. In the example provided in FIG. 2, the IWF logic 301 transmits the LBM 200 to the IWF 105. The IWF 105 performs a connectivity test on the TDM node 107, and transmits the LBR 205 (FIG. 2), based upon the performed connectivity test.

Thus, in step 502 the IWF logic 301 receives the LBR 205 having the connectivity test results on the TDM node 107 indicated in the TLV data 203 (FIG. 2). Receipt of the LBR 205 and evaluation of its TLV data 203 indicate that the TDM node 107 is operational.

Figure 6:
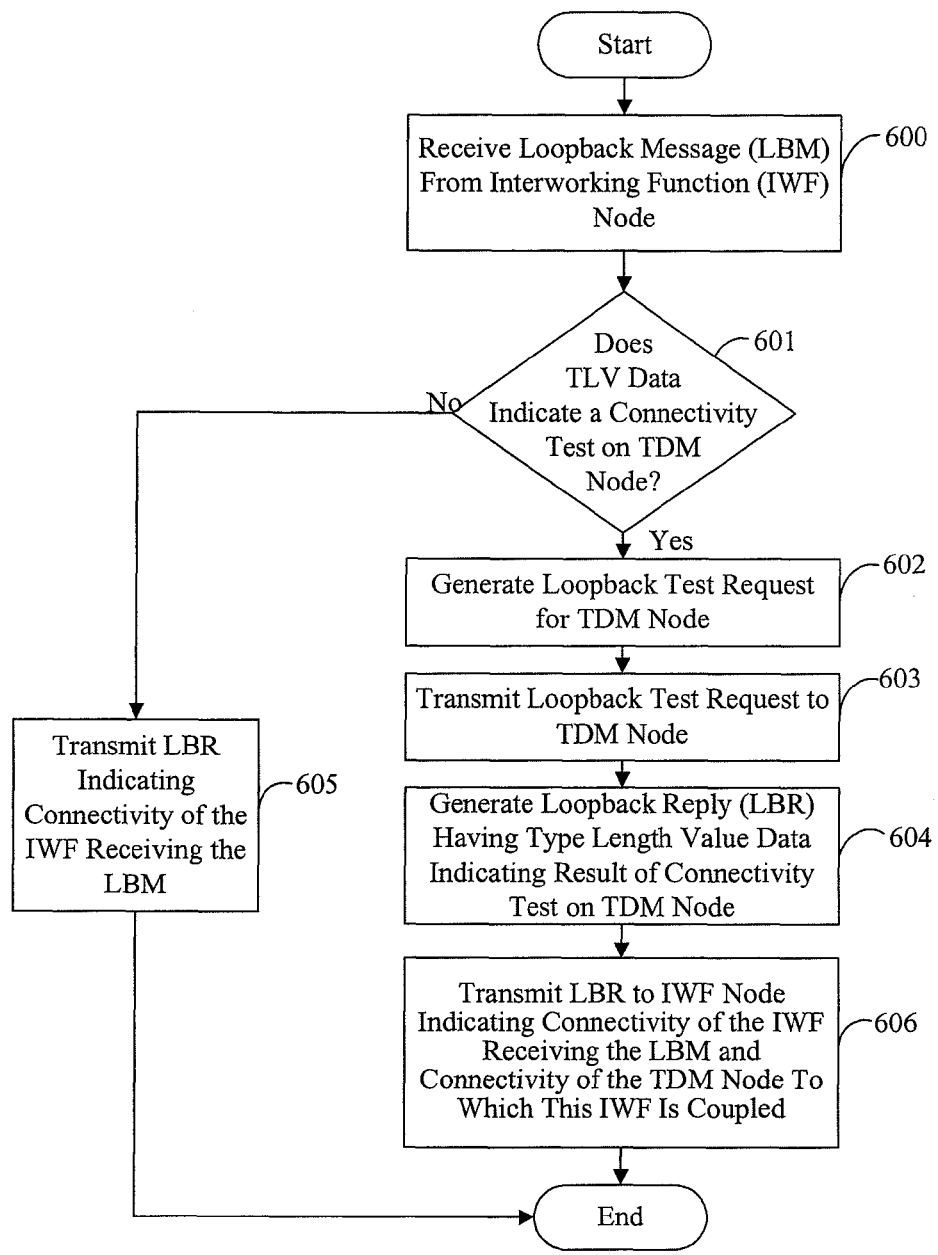
FIG. 6 is a flowchart depicting exemplary architecture and functionality of IWF logic depicted in FIG. 4.

FIG. 6 is a flowchart depicting exemplary architecture and functionality of the IWF logic 401 (FIG. 4). In step 600, the IWF logic 401 receives the LBM 200 (FIG. 2) from the IWF 103 (FIG. 2). The LBM 200 may comprise TLV data 202 (FIG. 2) indicating that the IWF logic 401 is to perform a connectivity test on the TDM node 107 (FIG. 2).

Thus, the IWF logic 401 interprets the TLV data 202 to determine whether a connectivity test is to be performed on the TDM node 107 in step 601. If the TLV data 202 does not indicate that a connectivity test is to be performed on the TDM node 107, the IWF logic 401 transmits an LBR 201 (FIG. 2) indicating connectivity of the IWF node 105 in step 605 in accordance with Ethernet OAM standards.

However, if the TLV data 202 indicates that a connectivity test be performed on the TDM node 107 in step 601, the IWF logic 401 generates a loopback test request 204 (FIG. 2) for the TDM 107, as indicated in step 602. The IWF logic 401 transmits the loopback test request 204 to the TDM node 107 in step 603.

In response to the loopback test request 204, the TDM node 107 may either not respond (e.g., if the TDM node 107 is not operating) or transmit a loopback test reply. The loopback test reply may indicate that there is a problem with the connection 106 and TDM node 107 or the loopback test reply may indicate that the connection 106 and the TDM node 107 are operational.

The IWF logic 401 then generates the LBR 201 (FIG. 2) having TLV data 203 (FIG. 2) indicating the result of the connectivity test on the TDM node 107 in step 604. Notably, the TLV data 203 may indicate that the connection 106 and the TDM node 107 are operational or may indicate that the connection 106 and the TDM node 107 are not operational. The IWF logic 401 transmits the LBR 201 to the IWF node 103 (FIG. 2) indicating connectivity of the IWF 105 receiving the LBM 200 and connectivity to the TDM node 107 to which the IWF 104 is coupled, as indicated in step 606.

Figure 7:
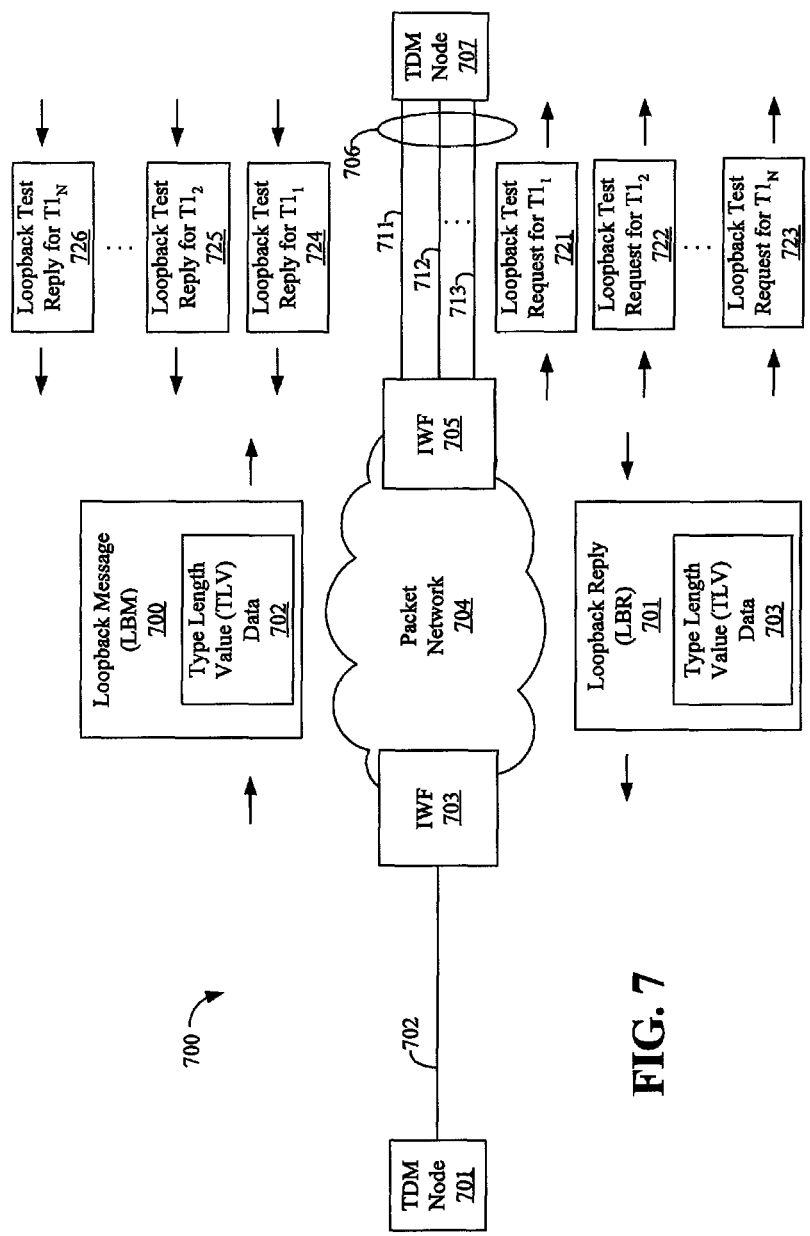
FIG. 7 depicts another exemplary embodiment of a TDM communication system having an embedded packet network wherein bonded connections are used for communication.

FIG. 7 depicts another exemplary embodiment of a TDM communication system 700 having an embedded packet network 704 wherein bonded connections 711-713 are used for communication. Bonded communication media are described in U.S. patent application Ser. No. 12/497,125 entitled "Systems and Methods for Allocating Bonding Engines in Network Communications" filed Jul. 2, 2009, which is incorporated herein by reference.

The system 700 has time division multiplexing (TDM) nodes 701, 707 that communicate with one another through a packet network 704, such as the Ethernet. In this regard, the TDM node 701 is coupled to an interworking function (IWF) 703 via a connection 702, which may include, for example, one or more twisted pairs or other types of conductive media.

In addition, the TDM node 707 is coupled to an IWF 705 of the packet network 704 via a plurality of connections 711-713, and each such connection 711-713 may include one or more twisted pairs for propagating a T1 signal or any other type of signal. The plurality of bonded connections 711-713 define a bonding group 706 that is used to transport at least one data stream between the IWF 705 and the TDM node 707. The communication system 700 behaves substantially similar to the packet network system 100 described with reference to FIG. 1.

Further note that "bonding" generally refers to a technology wherein multiple connections, e.g., the connections 711-713, hereinafter referred to as a "bonding group," are effectively joined together to provide increased bandwidth. The bonding group is associated with a maintenance end point (MEP) address. In this regard, both the IWF 703 and the IWF 705 each creates its own MEP. In addition, the MEPs created by the IWF 703 and IWF 705 are associated with one another. Notably, Ethernet OAM travels between the MEPs of the IWF 703 and the IWF 705. Connectivity between the MEPs of the IWF 703 and the IWF 705 can be verified. In this regard, IWF 703 sends out a LBM to the IWF 705. In response to receiving this LBM, IWF 705 sends a LBR back to the IWF 703. Connectivity is verified when the IWF 703 receives the LBR.

Each of the data packets transmitted through the packet network 704 and carrying the customer data of the TDM signal's layer 2 protocol from the TDM node 701 also comprises Ethernet overhead data (not shown). Such Ethernet overhead data includes, for example, Media Access Control (MAC) addresses and Virtual Local Area Network (VLAN) tags, which direct the data packets to the IWF of a corresponding TDM node. Based on such Ethernet overhead data, the IWF 703 and the IWF 705 determines that the customer data of the received packets is to be communicated to the TDM node 707 via the bonding group 706. In one embodiment, the bonding group is mapped to the data packet, i.e., through its corresponding Ethernet overhead.

The customer data may or may not be fragmented into multiple fragments, which are transmitted via the bonding group 706 to the TDM node 707. In this regard, the customer data is distributed into bonding group 706 for transport to TDM node 707. Each connection 711-713 carries data such that the data rate of the bonding group 706 is much higher than the data rate across any one of the connections 711-713. The TDM node 707 assembles the data from each connection that was originally distributed by the IWF 705.

When a connectivity test is to be performed, the IWF 703 transmits an LBM 700 comprising the MEP address associated with the bonded connections 711-713 to the IWF 705. The LBM 700 comprises TLV data 702 indicating that a connectivity test is to be performed on the TDM node 707. The IWF 705 receives the LBM 700, and the IWF 705 determines, based upon the TLV data 702, that a connectivity test is to be performed on the TDM node 707. Based on the MEP address of the LBM 700, the IWF 705 generates a plurality of loopback test requests 721-723, one for each of the connections 711-713 of the bonding group 706, and transmits each of the loopback test requests 721-723 over a respective one of the connections 711-713.

In one embodiment, link control protocol (LCP) is used and the loopback test requests 721-723 are LCP echo requests. In such an embodiment, the IWF 705 places in each of the loopback test requests 721-723 a test pattern, i.e., a particular arrangement of bits. In other embodiments, other types of protocols and tests may be employed The IWF 705 receives a response from the TDM node 707 for each of the connections 711-713. In this regard, the TDM node 707 may transmit a loopback test reply 724-726 for each of the connections 711-713. Notably, if any of the connections 711-713 is inoperable, a loopback test reply 724-726 may not be sent at all for the inoperable connection.

The IWF 705 listens to each of the connections 711-713 for the loopback test replies 724-726 that may be transmitted in response to the loopback test requests 721-723. As in the example provided, if an LCP echo request is sent for each connection 711-713, then the IWF 705 looks for the test pattern in the LCP echo replies 724-726 to determine if a reply 724-726 received via any of the connections 711-713 is erroneous, e.g., does not match the test pattern that was originally sent to the TDM node 707 in the LCP echo requests. If a loopback test reply 724-726 is not returned for a particular connection 711-713 after a specified period or the loopback test reply 724-726 is erroneous (e.g., does not return the pattern that was sent), then the IWF 705 determines that there is an error or problem with the particular connection 711-713 that either did not return a test replay or returned an erroneous reply. Thus, based on the loopback test replies 724-726, the IWF 705 determines if there is an error or problem with each connection 711-713.

The IWF 705 then transmits an LBR 701 having TLV data 703 that indicates the results of the loopback test requests 721-723. In this regard, the TLV data 703 may have a plurality of bits, wherein there is a respective bit corresponding to each of the connections 711-713 tested. Each such bit is controlled by the IWF 705 depending on the result of the test performed over the corresponding connection 711-713. As an example, if a valid loopback test reply was received from a particular connection 711-713 of the bonding group 706 indicating that this connection 711-713 and the TDM node 707 are operational, the IWF 705 may assert the bit in the TLV data 703 corresponding to such connection 711-713. However, if the connection 711-713 did not return a valid loopback test replay 724-726, then the IWF 705 may deassert the corresponding bit in the TLV data 703.

The IWF 703 receives the LBR having the corresponding TLV data 703. Based upon the TLV data 703, the IWF 703 can determine whether errors or problems exist on the connections 711-713 that connect the IWF 706 to the TDM node 707. In this regard, to determine whether a particular connection 711-713 passed or failed the loopback test, the IWF 703 can analyze the bit of the TLV data 703 corresponding to such connection. Notably, more than one bit in the TLV data 703 may correspond to any of the connections 711-713, if desired.

The invention claimed is:

1. A communication system for extending Ethernet Operation and Management (OAM) Loopback Message (LBM) and Loopback Replay (LBR) functionality into a time division multiplexing (TDM) domain, comprising:

a first interworking function (IWF) of an Ethernet network configured to transmit through the Ethernet network an Ethernet OAM LBM having a first type length value (TLV) field, the first IWF configured to control the first TLV field to indicate that a connectivity test based on the Ethernet OAM LBM is to extend beyond the Ethernet network to a TDM node of a TDM network; and a second IWF of the Ethernet network configured to receive the Ethernet OAM LBM and to interpret the first TLV field as indicating that a TDM connectivity test is to be performed by the second IWF, the second IWF configured to perform the TDM connectivity test across a TDM connection in response to the Ethernet OAM LBM and based on the first TLV field, the second IWF further configured to transmit a reply in response to the Ethernet OAM LBM through the Ethernet network to the first IWF, the reply comprising data indicative of a result of the TDM connectivity test.

2. The system of claim 1, wherein the reply comprises an Ethernet OAM loopback reply (LBR) message having a second TLV field indicating whether undisturbed connectivity exists between at least the second IWF and the TDM node.

3. The system of claim 2, wherein the first TLV field comprises a data string, wherein the second IWF is configured to transmit the data string to the TDM node via the TDM connection.

4. The system of claim 1, wherein the second IWF is configured to perform the TDM connectivity test by transmitting a Link Control Protocol (LCP) Echo Request to the TDM node.

5. The system of claim 1, wherein the second IWF is configured to perform the TDM connectivity test by transmitting a Frame Relay Link Management Interface (LMI) link integrity verification enquiry to the TDM node.

6. The system of claim 1, wherein the TDM connection comprises a plurality of bonded T1 links.

7. The system of claim 6, wherein the second IWF is configured to perform a TDM connectivity test across each of the plurality of bonded T1 links in response to the Ethernet OAM LBM and based on the first TLV field.

8. The system of claim 7, wherein the data indicates the TDM connectivity test for each of the plurality of bonded T1 links.

9. The system of claim 1, wherein the second IWF is configured to make a determination, based on the TDM connectivity test, whether there is undisturbed connectivity between at least the second IWF and the TDM node, and wherein the second IWF is configured to control the reply based on the determination.

10. The system of claim 9, wherein the second IWF is configured to perform the TDM connectivity test without transmitting the Ethernet OAM LBM to the TDM node.

11. A communication system for extending Ethernet Operation and Management (OAM) Loopback Message (LBM) and Loopback Replay (LBR) functionality into a time division multiplexing (TDM) domain, comprising:
 a first interworking function (IWF) of an Ethernet network configured to transmit an Ethernet OAM LBM having a first type length value (TLV) field comprising a data string, the first IWF configured to control the first TLV field to indicate that a connectivity test is to extend beyond the Ethernet network; and
 a second IWF of the Ethernet network configured to receive the Ethernet OAM LBM and to interpret the first TLV field, the second IWF configured to perform a TDM connectivity test across a TDM connection in response to the Ethernet OAM LBM and based on the first TLV field, the second IWF further configured to transmit a reply for the Ethernet OAM LBM to the first IWF, the reply prompted by the LBM and comprising data based on the TDM connectivity test, wherein the reply comprises an Ethernet OAM loopback reply (LBR) message having a second TLV field indicative of the TDM loopback test, wherein the second IWF is configured to transmit the data string to a TDM node via the TDM connection, and wherein the second IWF is configured to insert into the LBR message a retransmission of the data string by the TDM node.

12. A communication system for extending Ethernet Operation and Management (OAM) Loopback Message (LBM) and Loopback Replay (LBR) functionality into a time division multiplexing (TDM) domain:
 a TDM node; and
 an interworking function (IWF) on an edge of an Ethernet network coupled to the TDM node across a TDM connection, the IWF configured to receive from a node of the Ethernet network an Ethernet OAM LBM having a first type length value (TLV) field indicating that a TDM connectivity test is to be performed on the TDM node, the IWF configured to make a determination whether to perform the TDM connectivity test based on the TLV field and to perform the TDM connectivity test on the TDM node in response to the determination, the IWF further configured to generate a reply in response to the LBM and comprising data indicative of the TDM connectivity test.

13. The system of claim 12, wherein the reply comprises an Ethernet OAM loopback reply (LBR) message having a second TLV field indicative of the TDM connectivity test.

14. The system of claim 12, wherein the TDM connection comprises a plurality of bonded T1 links.

15. The system of claim 14, wherein the IWF is further configured to perform the TDM connectivity test on each of the plurality of bonded T1 links, wherein the data is indicative of each of the connectivity tests performed on each of the plurality of bonded T1 links.

16. The system of claim 12, wherein the IWF is configured to make a determination, based on the TDM connectivity test, whether there is undisturbed connectivity between at least the IWF and the TDM node, and wherein the IWF is configured to control the reply based on the TDM connectivity test.

17. The system of claim 16, wherein the IWF is configured to perform the TDM connectivity test without transmitting the Ethernet OAM LBM across the TDM connection.

18. A communication method for extending Ethernet Operation and Management (OAM) Loopback Message (LBM) and Loopback Replay (LBR) functionality into a time division multiplexing (TDM) domain, comprising:
 generating, by a first interworking function (IWF) on an edge of the Ethernet network, an Ethernet OAM LBM having a first type length value (TLV) field;
 receiving, by a second IWF on an edge of the Ethernet network, the Ethernet OAM LBM;
 interpreting the first TLV field at the second IWF as indicating that a TDM connectivity test is to be performed on a TDM node of a TDM network;
 performing the TDM connectivity test on the TDM node via the second IWF across a TDM connection in response to the interpreting; and
 transmitting a reply for the Ethernet OAM LBM from the second IWF to the first IWF, the reply comprising data indicative of a result of the TDM connectivity test.

19. The method of claim 18, wherein the transmitting comprises transmitting an Ethernet OAM loopback reply (LBR) message having a second TLV field indicative of the TDM connectivity test.

20. The method of claim 19, wherein the first TLV field comprises a data string, and wherein the method further comprises transmitting by the second IWF the data string to the TDM node via the TDM connection.

21. The method of claim 18, further comprising performing the TDM connectivity test by transmitting a Link Control Protocol (LCP) Echo Request to the TDM node.

22. The system of claim 18, further comprising performing the TDM connectivity test by transmitting a Frame Relay Link Management Interface (LMI) link integrity verification enquiry to the TDM node.

23. The method of claim 18, further comprising:
 determining at the second IWF whether there is undisturbed connectivity between at least the second IWF and the TDM node; and
 controlling the reply based on the determining.

24. The method of claim 23, wherein the performing the TDM connectivity test and the transmitting are performed without transmitting the Ethernet OAM LBM across the TDM connection.

25. A communication method for extending Ethernet Operation and Management (OAM) Loopback Message (LBM) and Loopback Replay (LBR) functionality into a time division multiplexing (TDM) domain, comprising:

generating, by a first interworking function (IWF) on an edge of the Ethernet network, an Ethernet OAM LBM having a first type length value (TLV) field indicating that a connectivity test is to extend beyond the Ethernet network, wherein the first TLV field comprises a data string; and receiving, by a second IWF on an edge of the Ethernet network, the Ethernet OAM LBM;

interpreting the first TLV field;

performing a TDM connectivity test across a TDM connection in response to the Ethernet OAM LBM and based on the first TLV field;

transmitting a reply for the Ethernet OAM LBM to the first IWF, the reply prompted by the OAM LBM and comprising data based on the TDM connectivity test;

transmitting by the second IWF the data string to a TDM node via the TDM connection, wherein the transmitting comprises transmitting an Ethernet OAM loopback reply (LBR) message having a second TLV field indicative of the TDM connectivity test; and inserting into the LBR message a retransmission of the data string by the TDM node.

\* \* \* \* \*